(12) United States Patent
Zhou et al.

(10) Patent No.: US 11,729,360 B2
(45) Date of Patent: Aug. 15, 2023

(54) PROJECTION DEVICE

(71) Applicant: IVIEW DISPLAYS (SHENZHEN) COMPANY LTD., Shenzhen (CN)

(72) Inventors: Yu Zhou, Shenzhen (CN); Mingnei Ding, Shenzhen (CN); Steve Yeung, Hong Kong (CN); Zhiqiang Gao, Hong Kong (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 0 days.

(21) Appl. No.: 17/503,430

(22) Filed: Oct. 18, 2021

(65) Prior Publication Data
US 2022/0070422 A1 Mar. 3, 2022

Related U.S. Application Data

(63) Continuation of application No. PCT/CN2020/125921, filed on Nov. 2, 2020.

(30) Foreign Application Priority Data

Aug. 27, 2020 (CN) .......................... 202021847960.9

(51) Int. Cl.
*H04N 9/31* (2006.01)
*G03B 21/14* (2006.01)
*H04N 23/90* (2023.01)

(52) U.S. Cl.
CPC ......... *H04N 9/3176* (2013.01); *G03B 21/145* (2013.01); *H04N 9/3194* (2013.01); *H04N 23/90* (2023.01)

(58) Field of Classification Search
CPC ...... G03B 21/008; G03B 21/28; G03B 21/53; G03B 21/145; G03B 21/147; G03B 21/2066; H04N 9/315; H04N 9/3126; H04N 9/3141; H04N 9/3152; H04N 9/3155; H04N 9/3173; H04N 9/3176; H04N 9/3194; H04N 5/64; H04N 5/247; G02B 27/0101; G02B 27/0149; G02B 27/0179

See application file for complete search history.

(56) References Cited

U.S. PATENT DOCUMENTS 9,052,579 B1 * 6/2015 Poulad .................... G06F 3/011
2012/0327315 A1 * 12/2012 Larsen ................... H04N 9/317
348/744

(Continued)

FOREIGN PATENT DOCUMENTS

CN 204305199 U 4/2015
CN 105093797 B 2/2017

(Continued)

*Primary Examiner* — Sultan Chowdhury
(74) *Attorney, Agent, or Firm* — IPro, PLLC; Na Xu

(57) ABSTRACT

Embodiments of the present disclosure, relating to the technical field of projection, provides a projection device. The projection device includes: an imaging module, configured to project images; a position adjustment module, connected to the projection module, and configured to adjust a position of the projection module; a controller, connected to the projection module and the position adjustment module, and configured to control the projection module to project images, and control the position adjustment module to adjust the position of the projection module.

11 Claims, 4 Drawing Sheets

(56) References Cited

U.S. PATENT DOCUMENTS

| | | |
|---|---|---|
| 2014/0039677 A1 | 2/2014 | Moore |
| 2015/0148960 A1 | 5/2015 | Moore |
| 2020/0049991 A1* | 2/2020 | Kusafuka ............ G02B 27/0101 |
| 2021/0218941 A1* | 7/2021 | Otsuki ................. G03B 21/142 |
| 2021/0289181 A1* | 9/2021 | Ueda .................... G03B 21/147 |

FOREIGN PATENT DOCUMENTS

| | | |
|---|---|---|
| CN | 206620196 U | 11/2017 |
| CN | 105262968 B | 10/2018 |
| CN | 208314433 U | 1/2019 |
| CN | 112040207 A | 12/2020 |

* cited by examiner

PROJECTION DEVICE

CROSS-REFERENCE TO RELATED APPLICATIONS

This application is a continuation-application of International (PCT) Patent Application No. PCT/CN2020/125921, filed on Nov. 2, 2020, which claims priority to Chinese Patent Application No. 202021847960.9, filed with the National Intellectual Property Administration of China on Aug. 27, 2020, and entitled "PROJECTION APPARATUS", the entire contents of which are incorporated herein by reference.

TECHNICAL FIELD

Embodiments of the present disclosure relate to the technical field of projection, and in particular, relate to a projection device.

BACKGROUND

A projection device is an optical instrument which magnifies, by using an optical element, an object to be projected, such as an image or a video, and projects the magnified object to be projected onto a screen. Some projection devices may be connected to a VCD, a DVD, a BD, a game machine, a DV, and the like via different interfaces to play corresponding video signals. Some other projection devices may be connected to a WiPlug, then a computer, a mobile phone, or a pad is connected to the WiPlug within a same Wi-Fi network, and finally content of the computer, the mobile phone or the pad may be projected onto the screen of the projection device. With the rapid development of the projection technologies, office projection devices are being continuously designed and manufactured, and people are imposing higher and higher requirements on artificial intelligence products in terms of user experience.

However, during practice of the present disclosure, the inventors have found that: the projection devices at the market are mostly fixedly placed, and when a position of a projection image needs to be adjusted, the placement position of the projection device needs to be manually readjusted, and thus the manual operation is inconvenient.

SUMMARY

Embodiments of the present disclosure are intended to provide a projection device. Where necessary, a position of a projection image projected by the projection module may be adjusted by a position adjustment module, with no need of manually adjusting a placement position of the projection device.

In view of the above, the embodiments of the present disclosure provide a technical solution of a projection device. The projection device includes: an imaging module, configured to project images; a position adjustment module, connected to the projection module, and configured to adjust a position of the projection module; a controller, connected to the projection module and the position adjustment module, and configured to control the projection module to project images, and control the position adjustment module to adjust the position of the projection module.

Optionally, the position adjustment module includes a base, a driving unit, and a mecanum wheel; wherein the driving unit is disposed on the base, rotatably connected to the mecanum wheel, and connected to the controller, the projection module is disposed on the base, and the controller is configured to control the driving unit to supply power to the mecanum wheel to adjust a position of the base, and hence to adjust the position of the projection module.

Optionally, four mecanum wheel are provided, two of the mecanum wheels are disposed on one side of the base, and the other two of the mecanum wheels are disposed on the other side opposite to the one side of the base; and the four driving units are provided, and each of the driving units corresponds to one of the mecanum wheels.

Optionally, the projection device further includes a driving module; wherein the projection module is rotatably disposed on the base, the driving module is connected to the controller and the projection module, and the controller is configured to control the driving module to drive the projection module to rotate relative to the base.

Optionally, the projection module includes a housing, a first imaging module, and a projection optical engine; wherein the housing is rotatably disposed on the base, the housing is provided with a receiving chamber, and the first imaging module and the projection optical engine are received in the chamber; and the first imaging module and the projection optical engine are both connected to the controller, and the controller is configured to control the projection optical engine to project images, and control the first imaging module to find a view for a projection image of the projection optical engine.

Optionally, the base is provided with a first bracket and a second bracket, wherein the first bracket is provided with a mounting hole, and the first bracket is opposite to the second bracket; the driving module includes a fixing portion and a driving portion, wherein the fixing portion is fixed to the first bracket, and the driving portion is rotatable relative to the fixing portion, and runs through the mounting hole; and the housing is provided with a first mounting portion and a second mounting portion, wherein the first mounting portion is opposite to the second mounting portion, the first mounting portion is fixed to the driving portion, and the second mounting portion is rotatably connected to the second bracket.

Optionally, the driving module is a motor.

Optionally, the projection device further includes a second imaging module; wherein the second imaging module is disposed on the base, and configured to acquire an image of surroundings of the projection device.

Optionally, the second imaging module includes a first camera, a second camera, a third camera, and a fourth camera; wherein the first camera, the second camera, the third camera, and the fourth camera are respectively disposed on four side surfaces of the base.

Optionally, the projection device further includes: a control key; wherein the control key is connected to the controller and the position adjustment module, and configured to cause the controller to be disconnected from the position adjustment module.

The embodiments of the present disclosure achieve the following beneficial effects: A projection device includes a projection module, a position adjustment module, and a controller. The controller is connected to the projection module and the position adjustment module. The controller is configured to control the projection module to project images, and control the position adjustment module to adjust a position of the projection module.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. It should be understood that the specific embodiments described herein are only intended to explain the present disclosure instead of limiting the present disclosure. Based on the embodiments of the present disclosure, all other embodiments derived by persons of ordinary skill in the art without any creative efforts shall fall within the protection scope of the present disclosure.

It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. As used herein, the terms "vertical," "horizontal," "left," "right," and similar expressions are for illustration purposes.

In addition, technical features involved in various embodiments of the present disclosure described hereinafter may be combined as long as these technical features are not in conflict.

Figure 1:
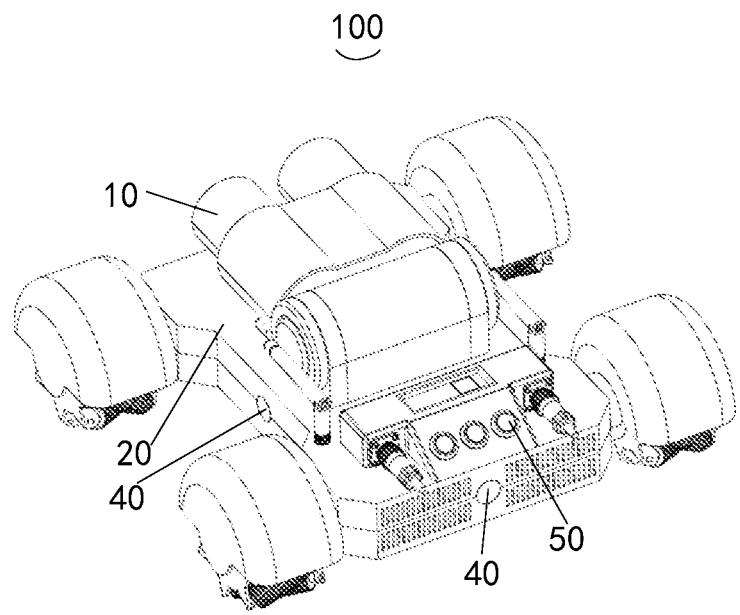
FIG. 1 is a schematic view of a projection device according to an embodiment of the present disclosure.
Figure 2:
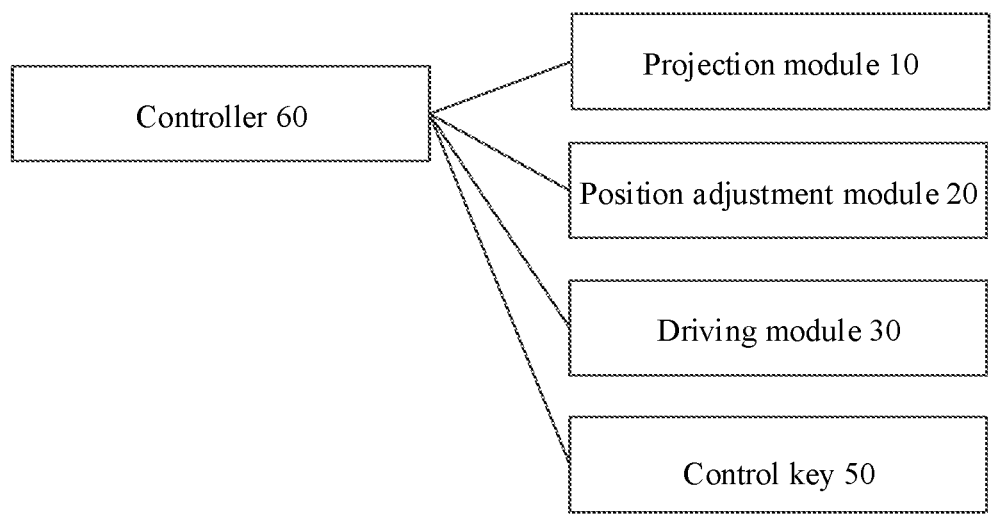
FIG. 2 is a diagram illustrating connections between parts of the projection device according to an embodiment of the present disclosure.

Referring to FIG. 1 and FIG. 2, a projection device 100 includes a projection module 10, a position adjustment module 20, a driving module 30, a second imaging module 40, a control key 50, and a controller 60. The projection module 10, the position adjustment module 20, the driving module 30, the second imaging module 40, and the control key 50 are disposed on the position adjustment module 20. The projection module 10 is configured to project an image. The position adjustment module 20 is configured to adjust a position of the projection module 10. The driving module 30 is configured to drive the projection module 10 to rotate relative to the position adjustment module 20. The second imaging module 40 is configured to acquire an image of surroundings of the projection device 100. The controller 60 is connected to the projection module 10, the position adjustment module 20, the driving module 30, and the control key 50. The controller 60 is configured to control the projection module 10 to project images and control the position adjustment module 20 to adjust the position of the projection module 10. The controller 60 is configured to control the driving module 30 to drive the projection module 10 to rotate relative to the position adjustment module 20. The control key 50 is configured to cause the controller 60 to be disconnected from the position adjustment module 20. By the projection device 100, when the position of the projection image projected by the projection module 10 needs to be adjusted, the position adjustment module 20 is controlled by the control module 60 to adjust the position of the projection module 10 with no need of manually adjusting the placement position of the projection device 100, which is convenient.

Figure 3:
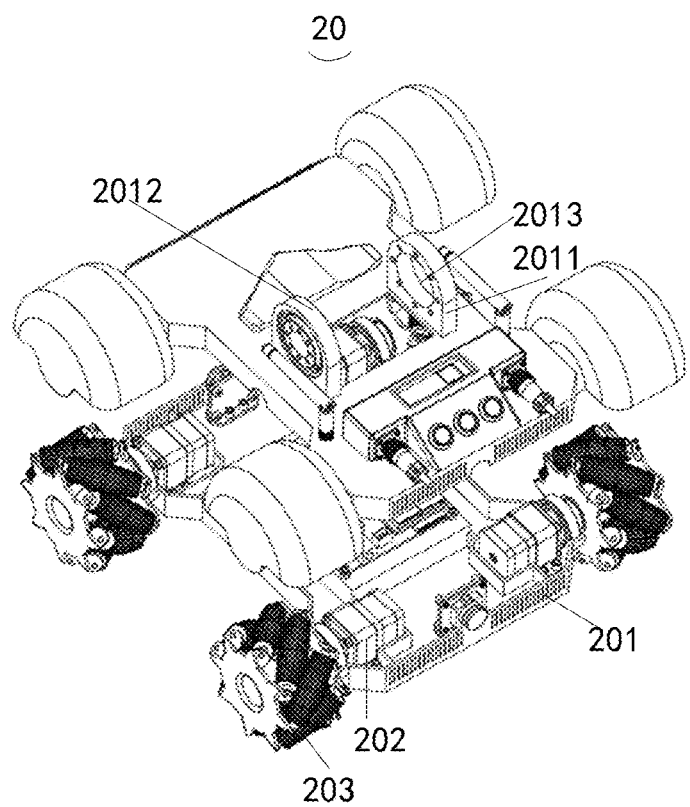
FIG. 3 is an exploded view of a position adjustment module according to an embodiment of the present disclosure.

With respect to the position adjustment module 20, referring to FIG. 3, the position adjustment module 20 includes a base 201, a driving unit 202, and a mecanum wheel 203; wherein the driving unit 202 is disposed on the base 201, rotatably connected to the mecanum wheel 203, and connected to the controller 60, the projection module 10 is disposed on the base 201, and the driving unit 202 is configured to supply power to the mecanum wheel 203 to adjust a position of the base 201, and to hence adjust the position of the projection module 10.

It should be noted that the driving unit 202 supplies power to the mecanum wheel 203 to adjust the position of the base 201, and to hence adjust the position of the projection module 10, which is not detailed herein any further.

It should be noted that, in some embodiments, the driving unit 202 is a motor.

It should be noted that, in some embodiments, the base 201 is provided with a first bracket 2011 and a second bracket 2012, wherein the first bracket 2011 is provided with a mounting hole 2013, and the first bracket 2011 is opposite to the second bracket 2012. The first bracket 2011 and the second bracket 2012 are connected to the projection module 10.

It should be noted that, in some embodiments, four mecanum wheels 203 are provided, two of the mecanum wheels 203 are disposed on one side of the base 201, and the other two of the mecanum wheels 203 are disposed on the other side opposite to the one side of the base 201; and four driving units 202 are provided, and each of the driving units 202 corresponds to one of the mecanum wheels 203.

It should be noted that the position adjustment module 20 is not limited to the above-described structure, and may have other structures. For example, the position adjustment module 20 includes a translation unit (not illustrated), a direction adjustment unit (not illustrated), a base plate (not illustrated), and a wheel (not illustrated). The translation unit, the direction adjustment unit, and the wheel are disposed on the base plate. The translation unit is connected to the wheel, and configured to drive the wheel to move forwards or backwards. The direction adjustment unit is connected to the wheel, and configured to adjust the direction in which wheel moves forwards or backwards. The direction adjustment unit may use a direction adjustment unit of an automobile, which is the related art, and is thus not detailed herein any further.

Figure 4:
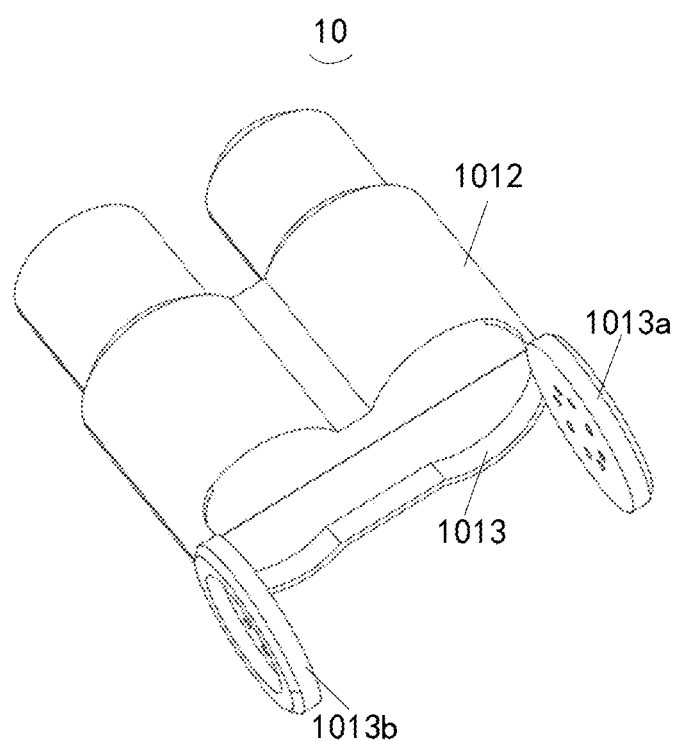
FIG. 4 is a schematic view of a projection module according to an embodiment of the present disclosure.
Figure 5:
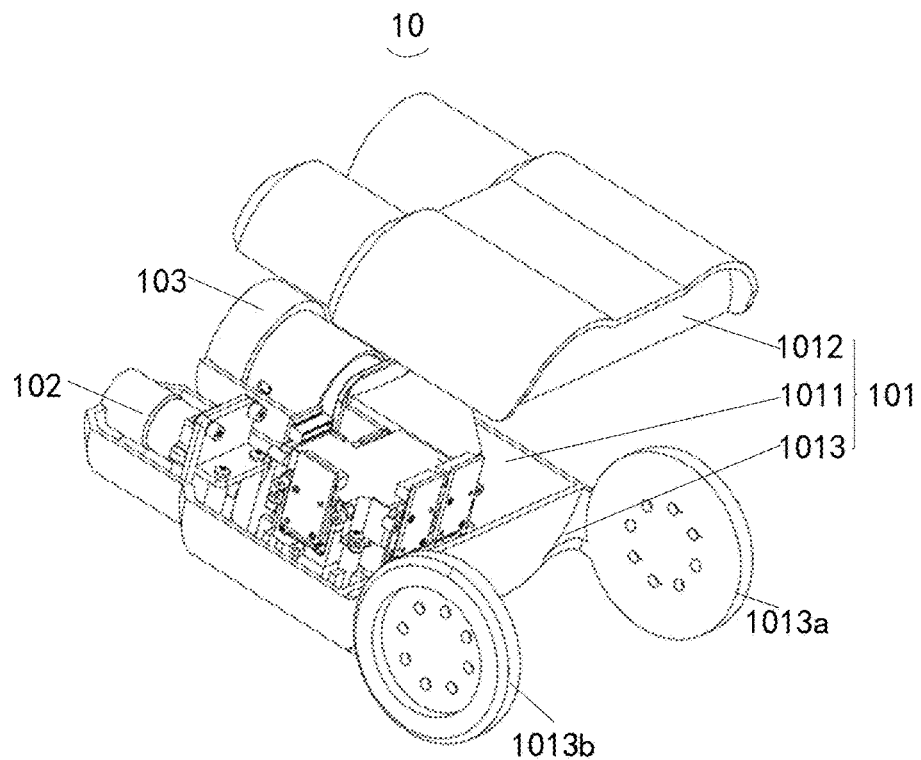
FIG. 5 is an exploded view of the projection module according to an embodiment of the present disclosure.

With respect to the projection module 10, referring to FIG. 4 and FIG. 5, the projection module 10 includes a housing 101, a first imaging module 102, and a projection optical engine 103. The housing 101 is rotatably disposed on the base 201 and provided with a receiving chamber 1011, and the first imaging module 102 and the projection optical engine 103 are received in the receiving chamber 1011. The first imaging module 102 and the projection optical engine 103 are both connected to the controller 60. The projection optical engine 103 is configured to project an image. The first imaging module 102 is configured to find a view for a projection image of the projection optical engine 103.

It should be noted that, in some embodiments, the housing 101 includes an upper housing 1012 and a lower housing 1013, wherein the upper housing 1012 covers the lower housing 1013. The receiving chamber 1011 is bounded by the upper housing 1012 and the lower housing 1013.

In some embodiments, the lower housing 1013 is provided with a first mounting portion 1013a and a second mounting portion 1013b, wherein the first mounting portion 1013a is opposite to the second mounting portion 1013b. The first mounting portion 1013a and the second mounting portion 1013b are configured to mount the projection module 10 onto the base 201.

Figure 6:
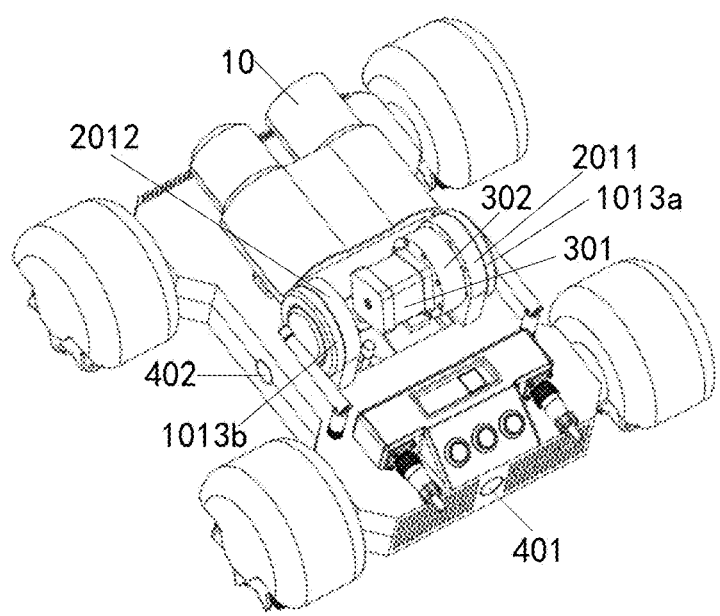
FIG. 6 is a schematic partial view of the projection device according to an embodiment of the present disclosure.

With respect to the driving module 30, referring to FIG. 6, the driving module 30 is connected to the projection module 10, and configured to drive the projection module 10 to rotate relative to the base 201, such that the projection of the projection image in a vertical direction is adjusted. The driving module 30 is configured to be connected to the controller 60. In some embodiments, the driving unit 30 is a motor.

It should be noted that, in some embodiments, the driving module 30 includes a fixing portion 301 and a driving portion (not illustrated), wherein the fixing portion 301 is fixed to first bracket 2011, and the driving portion is rotatable relative to the fixing portion 301, and runs through the mounting hole 2013. The driving portion is fixed to the first mounting portion 1013a of the housing 101 of the projection module 10, and the second mounting portion 1013b of the housing 101 of the projection module 10 is rotatably connected to the second bracket 2012 of the base 201 of the position adjustment module 20. The driving portion of the driving module 30 is capable of driving the first mounting portion 1013a to rotate, and further driving the second mounting portion 1013b to rotate, such that the driving module 30 drives the projection module 10 to rotate relative to the base 201 of the position adjustment module 20.

It should be noted that, in some embodiments, the driving module 30 further includes a decelerator 302, wherein the fixing portion 301 is connected to one end of the decelerator 302, and the other end of the decelerator 302 is fixed to the first bracket 2011. By configuring the decelerator 302, the driving module 30 is stable during the start. In some embodiments, the decelerator 302 is a harmonic reducer.

With respect to the second imaging module 40, referring to FIG. 6, the second imaging module 40 is disposed on the base 201, and configured to acquire an image of surroundings of the projection device 100. In some embodiments, the second imaging module 40 includes a first camera 401, a second camera 402, a third camera (not illustrated), and a fourth camera (not illustrated); wherein the first camera 401, the second camera 402, the third camera, and the fourth camera are respectively disposed on four side surfaces of the base 201.

With respect to the control key 50, referring to FIG. 1 and FIG. 2, the control key 50 is connected to the controller 60 and the position adjustment module 20, and configured to cause the controller 60 to be disconnected from the position adjustment module 20, or configured to cause the controller 60 to be connected to the position adjustment module. By configuring the control key 50, in the case that the projection image of the projection module 10 reaches an ideal state, the projection device 100 may be locked by the control key 50, such that the projection device 100 is prevented from being triggered by mistakes, and the controller 60 controls the position adjustment module 20 to adjust the position of the projection module 10.

With respect to the controller 60, referring to FIG. 2, the controller 60 is connected to the projection module 10, the position adjustment module 20, the driving module 30, and the control key 50. The controller 60 is configured to control the projection module 10 to project images and control the position adjustment module 20 to adjust the position of the projection module 10. The controller 60 is configured to control the driving module 30 to drive the projection module 10 to rotate relative to the position adjustment module 20. The controller 60 may be disconnected from the position adjustment module 20 by the control key 50.

It should be noted that program steps involved in the controller 60 employ conventional program steps. The controller 60 may also employ a convention processor, for example, an Intel I3 processor, an AMD Ryzen processor, or the like.

It should be noted that, in some embodiments, the controller 60 predefines a distance by which the position adjustment module 20 adjusts the projection module 10. Where the position of the projection image projected by the projection module 10 needs to be adjusted, the controller 60 controls the position adjustment module 20 to adjust the position of the projection module 10 by the predefined distance. It should be noted that the controller 60 controls the position adjustment module 20 to adjust the projection module 10 to advance by the predefined distance, thereby obtaining an ideal projection image.

In some other embodiments, the controller 60 adjusts the position of the projection module 10 by adjusting the position adjusting module 20 by a direction and a distance manually input by a user.

In an embodiment of the present disclosure, the projection device 100 includes the projection module 10, the position adjustment module 20, and the controller 60. The controller 60 is connected to the projection module 10, and the position adjustment module 20. The controller 60 is configured to control the projection module 10 to project images and control the position adjustment module 20 to adjust the position of the projection module 10. By connecting the position adjustment module 10 to the projection module 20, where necessary, a position of a projection image projected by the projection module 20 may be adjusted by the position adjustment module 10, with no need of manually adjusting a placement position of the projection device 100, which is convenient.

It should be noted that the specification and drawings of the present disclosure illustrate preferred embodiments of the present disclosure. However, the present disclosure may be implemented in different manners, and is not limited to the embodiments described in the specification. The embodiments described are not intended to limit the present disclosure, but are directed to rendering a thorough and comprehensive understanding of the disclosure of the present disclosure. In addition, the above described technical features may incorporate and combine with each other to derive various embodiments not illustrated in the above specification, and such derived embodiments shall all be deemed as falling within the scope of the specification of the present disclosure. Further, a person skilled in the art may make improvements or variations according to the above description, and such improvements or variations shall all fall within the protection scope as defined by the claims of the present disclosure.

What is claimed is:

1. A projection device, comprising:
    a projection module, configured to project an image;
    a position adjustment module, comprises a base, a driving unit, and a mecanum wheel; wherein the driving unit is disposed on the base, rotatably connected to the mecanum wheel, the projection module is disposed on the base, and the driving unit configured to adjust a position of the projection module; and
    a controller, connected to the projection module and the driving unit, and configured to control the projection module to project images, and control the driving unit to supply power to the mecanum wheel to adjust a position of the base and hence to adjust the position of the projection module.

2. The projection device according to claim 1, wherein four mecanum wheel are provided, two of the mecanum wheels are disposed on one side of the base, and the other two of the mecanum wheels are disposed on the other side opposite to the one side of the base; and the four driving units are provided, and each of the driving units corresponds to one of the mecanum wheels.

3. The projection device according to claim 1, further comprising: a driving module; wherein the projection module is rotatably disposed on the base, the driving module is connected to the controller and the projection module, and the controller is configured to control the driving module to drive the projection module to rotate relative to the base.

4. The projection device according to claim 3, wherein the projection module comprises a housing, a first imaging module, and a projection optical engine; wherein
    the housing is rotatably disposed on the base and provided with a receiving chamber, and the first imaging module and the projection optical engine are received in the receiving chamber; and
    the first imaging module and the projection optical engine are both connected to the controller, and the controller is configured to control the projection optical engine to project images, and control the first imaging module to find a view for a projection image of the projection optical engine.

5. The projection device according to claim 4, wherein
    the base is provided with a first bracket and a second bracket, wherein the first bracket is provided with a mounting hole, and the first bracket is opposite to the second bracket;
    the driving module comprises a fixing portion and a driving portion, wherein the fixing portion is fixed to the first bracket, and the driving portion is rotatable relative to the fixing portion, and runs through the mounting hole; and
    the housing is provided with a first mounting portion and a second mounting portion, wherein the first mounting portion is opposite to the second mounting portion, the first mounting portion is fixed to the driving portion, and the second mounting portion is rotatably connected to the second bracket.

6. The projection device according to claim 5, wherein the driving module is a motor.

7. The projection device according to claim 4, wherein the driving module is a motor.

8. The projection device according to claim 3, wherein the driving module is a motor.

9. The projection device according to claim 1, further comprising: a second imaging module; wherein the second imaging module is disposed on the base, and configured to acquire an image of surroundings of the projection device.

10. The projection device according to claim 9, wherein the second imaging module comprises a first camera, a second camera, a third camera, and a fourth camera; wherein the first camera, the second camera, the third camera, and the fourth camera are respectively disposed on four side surfaces of the base.

11. The projection device according to claim 1, further comprising: a control key; wherein the control key is connected to the controller and the position adjustment module, and configured to cause the controller to be disconnected from the position adjustment module.

* * * * *